United States Patent
Hinterholzer et al.

(10) Patent No.: US 6,308,824 B1
(45) Date of Patent: Oct. 30, 2001

(54) TUBE CONVEYOR

(75) Inventors: Stefan Hinterholzer, St. Michael; Franz Kessler, Leoben, both of (AT)

(73) Assignee: Binder + Co. Aktiengesellschaft, Gleisdorf (AT)

( * ) Notice: Subject to any disclaimer, the term of this patent is extended or adjusted under 35 U.S.C. 154(b) by 0 days.

(21) Appl. No.: 09/603,634

(22) Filed: Jun. 26, 2000

(30) Foreign Application Priority Data

Jun. 29, 1999 (AT) .................................................. A 1126/99

(51) Int. Cl.⁷ .................................................. B65G 15/08
(52) U.S. Cl. ............................................. 198/819; 198/824
(58) Field of Search .................................. 198/819, 824, 198/825

(56) References Cited

U.S. PATENT DOCUMENTS 4,526,272   7/1985   Peterson .................. 198/819
5,042,646   8/1991   Beatty ..................... 198/819

*Primary Examiner*—James R. Bidwell
(74) *Attorney, Agent, or Firm*—Collard & Roe, P.C.

(57) ABSTRACT

A tube conveyor, in particular a tube conveyor in which an endlessly revolving conveying belt is guided at least partly in the interior of carrier rolls (5) which are attached in a ring-shaped manner and whose axes extend substantially transversally to the direction of conveyance, and is substantially shaped into a tube, with the return of the conveying belt (3) being performed outside of the loaded strand shaped into a tube. In order to provide a tube conveyor which does not require any additional external supporting rolls for the return of the unloaded strand and thus both simplifies the installation of such a tube conveyor and reduces its noise production during operation, the return of the unloaded strand (9) of the conveying belt (3) is performed while resting on the upper carrier rolls (5) which are arranged in a ring-shaped manner.

5 Claims, 2 Drawing Sheets

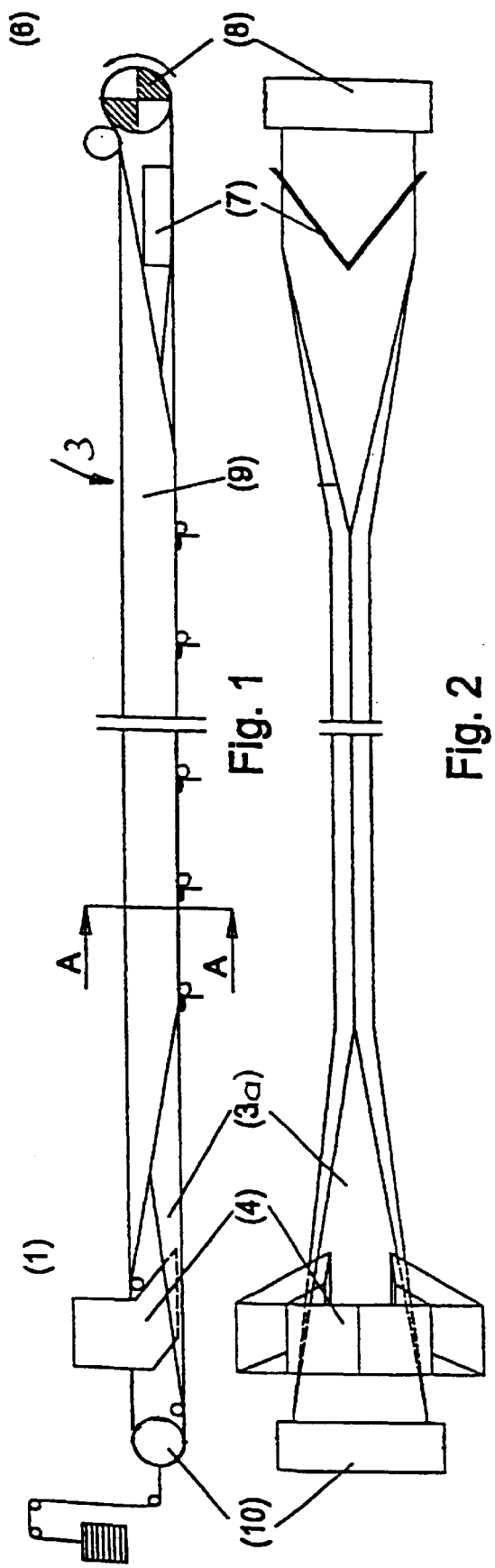
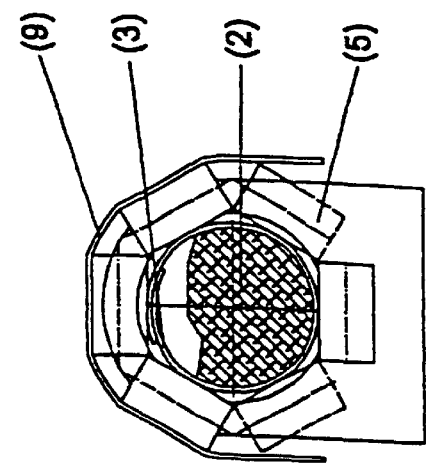
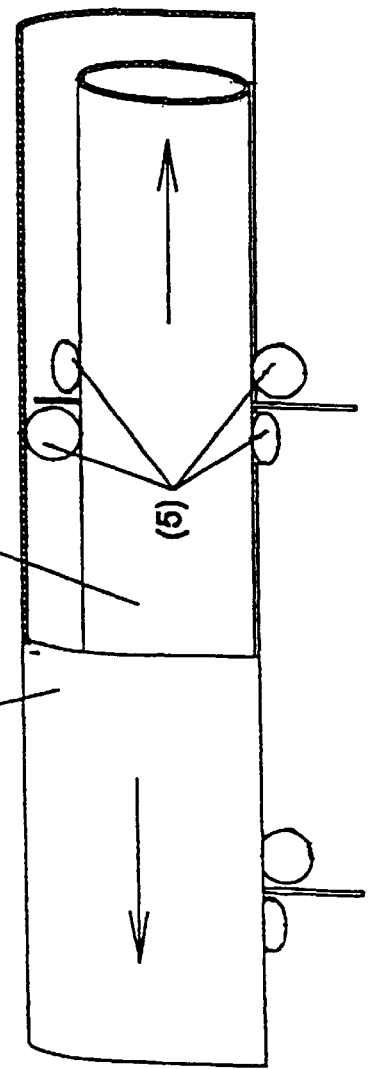
Fig. 1
Fig. 2
Fig. 3
Fig. 4

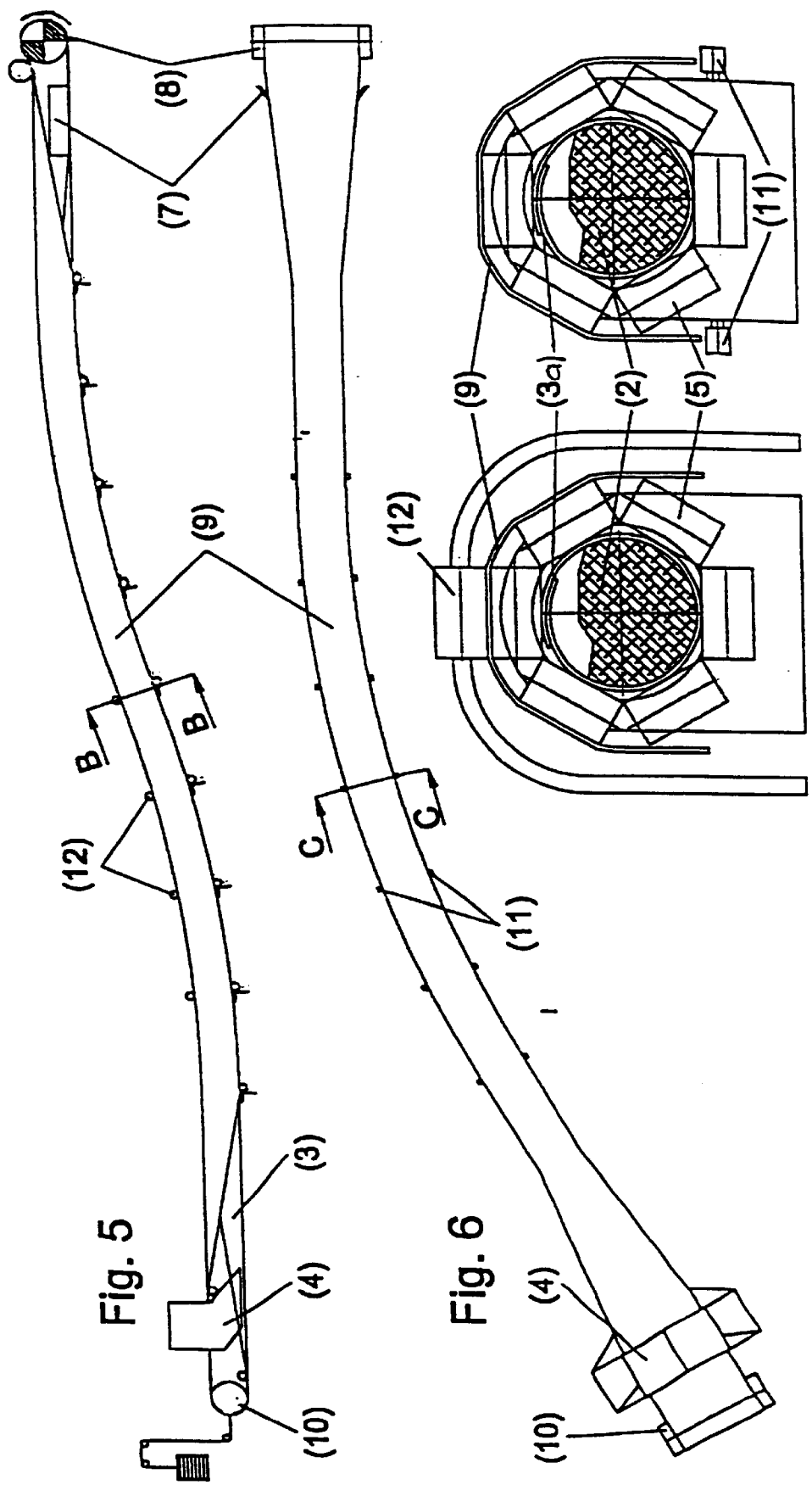

TUBE CONVEYOR

BACKGROUND OF THE INVENTION

1. Field of the Invention

The invention relates to a tube conveyor, in particular a tube conveyor in which the endlessly revolving conveying means such as the belt of a conveyor is guided in the interior of rolls which are attached in a ring-like manner and whose axes extend substantially transversally to the direction of conveyance and is substantially shaped into a tube.

2. Description of the Prior Art

In order to convey material to be conveyed as is produced in mining, for example, between different locations, belt conveyors, among other things, are used in practice.

It has been noticed that conventional belt conveyors are merely suitable for transport on straight paths since curves cause a different change in the length of the two side edges of the conveyor belt which is not possible with a conventional straight belt conveyor.

This problem is solved by the use of a tube conveyor.

In this process a part of the conveyor belt is rolled together into a tube-like conveyor belt, thus firstly providing the possibility to also build curved conveyor belt pathways and secondly preventing any spilling of the material to be conveyed, which is a problem frequently encountered in practical operation where bulk materials are concerned.

U.S. Pat. No. 5,042,646 A and U.S. Pat. No. 4,526,272 A describe such tube conveyors. The partly tubular cross section of the conveying belt is achieved by arranging the same within conveying rolls which are arranged in a ring-shaped manner transversally to the direction of conveyance. The return of the empty conveying belt is performed outside of the carrying rollers arranged in a ring-shaped way.

The problematic aspect of the tube conveyors, as are described in U.S. Pat. No. 5,042,646 A and U.S. Pat. No. 4,526,272 A, is the fact however that the return of the loose side of the belt (the unloaded strand) occurs underneath the loaded strand, which means that the loose side is guided from below to the loaded strand and partly encompasses the same in a U-shaped manner.

This leads to a course of the belt which is similar to that of conventional belt conveyors. The loaded strand is situated at the top and the unloaded strand is situated below. For the purpose of supporting the unloaded strand which is supplied to the carrier rolls attached in a ring-shaped manner, additional supporting rolls are necessary outside at the lower side of the unloaded stand. Said supporting rolls considerably increase the amount of required work for the installation of such a tube conveyor. Moreover, such externally arranged additional supporting rolls contribute substantially to the production of noise in such a tube conveyor.

SUMMARY OF THE INVENTION

It is the object of the present invention to provide a tube conveyor which does not require any additional external supporting rolls for the return of the unloaded strand and thus both simplifies the installation of such a tube conveyor as well as reduces its noise production in operation.

This is achieved in accordance with the invention by the characterizing features of claim 1.

As a result of the unloaded strand above the loaded strand, the unloaded strand can rest substantially on the same rolls as the loaded strand. No additional supporting rolls are required.

For precise adjustment and secure guidance, only guide rolls in accordance with the characterizing part of claim 2 are provided. They can be provided with a very delicate design and are only required in a small number and only in the curves.

Additional guide rolls are provided on the upper side of the unloaded strand in accordance with the characterizing feature of claim 3 in order to prevent any lift-off of the unloaded strand from the ring-shaped carrying rolls.

BRIEF DESCRIPTION OF THE DRAWING

A detailed description of the invention is provided below by reference to the enclosed drawings, wherein:

FIG. 1 shows an elevated view of a tube conveyor in accordance with the invention;

FIG. 2 shows a top view of a tube conveyor in accordance with the invention;

FIG. 3 shows a detail of the route progress in a partial sectional view;

FIG. 4 shows a sectional view through a tube conveyor in accordance with the invention along line A—A of FIG. 1;

FIG. 5 shows a tube conveyor with a horizontal curve progress;

FIG. 6 shows a tube conveyor with a vertical curve progress;

FIG. 7 shows a sectional view through a tube conveyor in accordance with line B—B from FIG. 5;

FIG. 8 shows a sectional view of a tube conveyor in accordance with line C—C from FIG. 6.

DESCRIPTION OF THE PREFERRED EMBODIMENTS

FIG. 1 shows an elevated view of a tube conveyor in accordance with the invention. A supply station 1 is provided at the beginning of the tube conveyor as seen in the direction of conveyance. In the present case, it concerns conveyor chute 4. This task could also be performed by a continuous transporter such as a belt conveyor, a vibrating conveyor or a worm conveyor or the like. The introduction of the material 2 to be conveyed is performed laterally into the revolving conveying means 3 which can be differentiated between an unloaded strand 9 and a loaded strand 3a.

FIG. 2 shows a top view of a tube conveyor in accordance with the invention. The conveying means 3 extends around a tail pulley 10 up to a tail/drive pulley 8. These pulleys 10, 8 are wrapped around closely by the conveying means 3. The conveying means 3 is provided in this zone with an open, linear cross section.

As a result of the carrier rolls 5 arranged in a ring-shape manner along the conveying path, the conveying means 3 is wrapped together into a closed cross section. The thus resulting cross section is determined by the arrangement of the carrier rolls 5 and can assume the shape of a triangle, quadrangle, polygon, circle or the like. This section is used as loaded strand. The material 2 to be conveyed is enveloped by the closing conveying means 3a and is conveyed in the same along the conveying path up to the delivery station 6.

At the delivery station 6 there is again a transition from the closed cross section of the conveying means 3a to an open line-like cross section. The conveyed material 2 is laterally discharged by a stripper 7 such as a plow stripper for example. Thereafter the conveying means 3 is upwardly deflected by a deflection/drive pulley.

The empty conveying means, which is designated here as unloaded strand 9, is supported during the return trip to the supply station 1 by said upwardly disposed carrier rolls 5 which are attached in a ring-like manner. The cross section of the unloaded strand 9 changes from a line-shaped cross section at the deflection/drive pulley 8 into a U-shaped cross section (see FIG. 3) at the upper carrier rolls 5 arranged in a ring-shaped manner along the conveying path. Before reaching the deflection pulley 10, the unloaded strand 9 is changed again from the U-shaped cross section to the open line-shaped cross section in order to be deflected thereafter at the deflection pulley 10, which in the present case also acts as a tensioning pulley, and can be guided to the supply station again.

Once the tube conveyor, as is shown in FIG. 5, is guided by vertical curves or, as shown in FIG. 6, by horizontal curves or by a combination of horizontal and vertical curves, there are no guidance problems for the closed cross section of the conveying means 3 as a result of the carrier rolls 5 which are attached in a ring-shaped manner along the conveying path.

Check rolls 11 (see FIG. 8) are arranged under the two edges of the unloaded strand 9 for the purpose of secure guidance of the unloaded strand 9 in the zone of the horizontal curve path in order to prevent any lateral slippage of the unloaded strand 9 in the horizontal curve. In zones with a strongly curved vertical curve guidance an additional guide roll 12 is arranged on the upper side of the unloaded strand 9. It is to prevent that the conveying means 3 lifts off from the carrier rolls 5 which are arranged in a ring-shape manner.

The attachment of additional supporting rolls for the unloaded strand 9 can be omitted in the tube conveyor in accordance with the invention.

What is claimed is:

1. A tube conveyor, in particular a tube conveyor in which the endlessly revolving conveying means such as a conveying belt is guided at least partly in the interior of carrier rolls which are attached in a ring-shaped manner and whose axes extend substantially transversally to the direction of conveyance, and is substantially shaped into a tube, with the return of the conveying means being performed outside of the loaded strand which is shaped into a tube, characterized in that the return of the unloaded strand of the conveying means occurs resting on the upper carrier rolls which are attached in a ring-shaped manner.

2. A tube conveyor as claimed in claim 1, characterized in that guide rolls are disposed under two edges of the unloaded strand of the conveying means in order to prevent any lateral slippage of the conveying means.

3. A tube conveyor as claimed in claim 1, characterized in that additional guide rolls (12) are arranged on the upper side of the unloaded strand (9) in order to prevent any lift off of the unloaded strand (9) from the carrier rolls (5) arranged in a ring-shaped manner.

4. A tube conveyor as claimed in claim 1, characterized in that the length of the carrier rolls (5) arranged in a ring-shaped manner is different.

5. A tube conveyor as claimed in claim 1, characterized in that the unloaded strand (9) encloses the tubular portion of the conveying belt (3) in a U-shaped manner in the zone of resting on the upper carrier rolls (5) which are arranged in a ring-shaped manner.

* * * * *